US006778896B1

United States Patent
Matsuura et al.

(10) Patent No.: US 6,778,896 B1
(45) Date of Patent: Aug. 17, 2004

(54) CURVE APPROACH CONTROL APPARATUS

(75) Inventors: Munenori Matsuura, Tokyo (JP); Akira Takahashi, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 162 days.

(21) Appl. No.: 09/631,939

(22) Filed: Aug. 3, 2000

(30) Foreign Application Priority Data

Aug. 6, 1999 (JP) .......................................... P 11-224455

(51) Int. Cl.[7] .............................................. G01C 21/00
(52) U.S. Cl. ................................ 701/70; 701/72; 701/93
(58) Field of Search ............................... 701/93, 70, 72; 340/441

(56) References Cited

U.S. PATENT DOCUMENTS

| 5,315,295 | A | * | 5/1994 | Fujii ........................... 340/936 |
| 5,978,724 | A | * | 11/1999 | Sekine ......................... 701/70 |
| 6,062,659 | A | * | 5/2000 | Matsuda ....................... 303/160 |
| 6,067,497 | A | * | 5/2000 | Sekine et al. .................. 701/93 |
| 6,081,761 | A | * | 6/2000 | Harada et al. ................. 701/72 |
| 6,092,005 | A | | 7/2000 | Okada |
| 6,092,014 | A | | 7/2000 | Okada |
| 6,125,324 | A | * | 9/2000 | Matsuda et al. ............ 701/208 |
| 6,141,617 | A | * | 10/2000 | Matsuda et al. .............. 701/72 |
| 6,169,952 | B1 | * | 1/2001 | Matsuda et al. .............. 701/72 |

FOREIGN PATENT DOCUMENTS

| JP | 8-2274 | 1/1996 |
| JP | 10-122872 | 5/1998 |
| JP | 10-269499 | 10/1998 |
| JP | 11-83501 | 3/1999 |

* cited by examiner

Primary Examiner—Michael J. Zanelli
(74) Attorney, Agent, or Firm—Smith, Gambrell & Russell, LLP

(57) ABSTRACT

The present invention provides a curve approach control apparatus comprising an allowable lateral acceleration setting unit to set as an allowable lateral acceleration a lateral acceleration that a vehicle can tolerate when it negotiates a curve in front; an allowable approach speed setting unit to set as an allowable approach speed an approach speed at which the vehicle can negotiate the curve, based on at least the allowable lateral acceleration; a decision control unit to estimate and judge an approach of the vehicle to the curve based on at least the allowable approach speed and execute a predetermined control; and a road surface friction coefficient estimation unit to estimate a road surface friction coefficient. The allowable lateral acceleration setting unit corrects, according to the road surface friction coefficient, an allowable percentage of the lateral acceleration that occurs in the vehicle as it negotiates the curve and sets the allowable lateral acceleration.

9 Claims, 6 Drawing Sheets

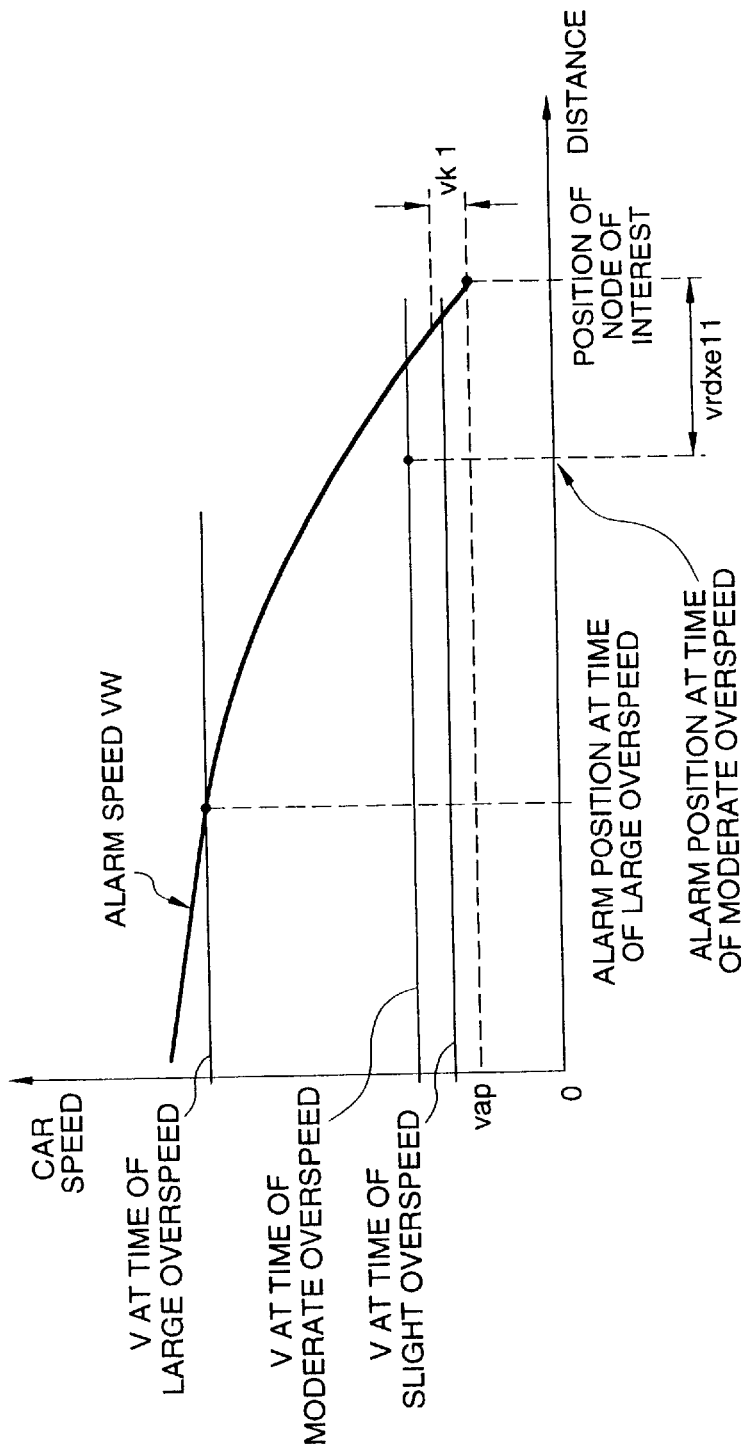

CURVE APPROACH CONTROL APPARATUS

BACKGROUND OF THE INVENTION

1. Field of the Invention

The present invention relates to a curve approach control apparatus which calculates, based on an allowable lateral acceleration, an allowable approach speed at which a vehicle negotiates a curve in front and, based on the allowable approach the curve.

2. Description of the Prior Art

Many curve approach control apparatus have been proposed which use road map data in a navigation device to detect an overspeed state of a vehicle with respect to a curve in front and activate an alarm or deceleration control.

For example, Japanese Patent Unexamined Publication No. Hei. 10-269499 (JP-A-10-269499) discloses a technology which judges presence or absence of a curve in front of the vehicle based on various information from a navigation device, calculates a radius of curvature of the curve, detects a driving state (sportiness level) of a driver and, based on the driving state information, sets an allowable lateral acceleration at which the vehicle can trace the curve. Then, based on the radius of curvature information and the allowable lateral acceleration, the disclosed technology calculates an allowable turning speed of the vehicle in the curve (allowable approach speed) and performs control to reduce the vehicle speed down to the allowable turning speed before the vehicle enters the curve.

On a road with a high road surface friction coefficient $\mu$ when a limit lateral acceleration is high, a vehicle generally can turn a curve of the same radius of curvature at a higher cornering speed than on a road with a small $\mu$, when the vehicle takes a corner at the limit lateral acceleration. When the limit lateral acceleration is exceeded on a road with a high $\mu$ and the vehicle can not trace own course and collides against some object, the damage it sustains is greater because the cornering speed is higher.

In the conventional technology described above, however, the setting of the allowable lateral acceleration does not take the above conditions of the roads with high or low $\mu$ into consideration and cannot be said to secure a sufficient safety.

SUMMARY OF THE INVENTION

The present invention has been accomplished under the above circumstance and provides a curve approach control apparatus which considers the condition of the road with high or low $\mu$ to allow the allowable lateral acceleration to be set optimumly and thereby further improve the safety of the vehicle.

To solve the above problem, according to a first aspect of the present invention, a curve approach control apparatus comprises: an allowable lateral acceleration setting means to set as an allowable lateral acceleration a lateral acceleration that a vehicle can tolerate when it negotiates a curve in front; an allowable approach speed setting means to set as an allowable of approach speed an approach speed at which the vehicle can negotiate the curve, based on at least the allowable lateral acceleration; a decision control means to estimate and judge an approach of the vehicle to the curve based on at least the allowable approach speed and execute a predetermined control; and a road surface friction coefficient estimation means to estimate a road surface friction coefficient; wherein the allowable lateral acceleration setting means corrects, according to the road surface friction coefficient, an allowable percentage of the lateral acceleration that occurs in the vehicle as it negotiates the curve and sets the allowable lateral acceleration.

According to a second aspect of the present invention, in the curve approach control apparatus shown in the first aspect, the allowable lateral acceleration setting means corrects the allowable percentage of the lateral acceleration that occurs in the vehicle as it negotiates the curve so that it decreases as the road surface friction coefficient increases.

According to a third aspect of the present invention, in the curve approach control apparatus shown in the first aspect, the allowable lateral acceleration setting means sets to a constant percentage the allowable percentage of the lateral acceleration that occurs in the vehicle as it negotiates the curve when the road surface friction coefficient is equal to or less than a preset value and, when the road surface friction coefficient is in excess of the preset value, sets the allowable lateral acceleration to a predetermined constant value.

That is, the curve approach control apparatus of the first aspect estimates the road surface friction coefficient by the road surface friction coefficient estimation means. Then, the allowable lateral acceleration setting means corrects, according to the road surface friction coefficient, the allowable percentage of the lateral acceleration that occurs in the vehicle as it negotiates the curve in front and sets the lateral acceleration that the vehicle can tolerate as the allowable lateral acceleration. The allowable approach speed setting means sets as an allowable approach speed an approach speed at which the vehicle can negotiate the curve, based on at least the allowable lateral acceleration. The decision control means estimates and judges an approach of the vehicle to the curve based on at least the allowable approach speed and executes a predetermined control.

The curve approach control apparatus of the second aspect has the allowable lateral acceleration setting means in the curve approach control apparatus of the first aspect correct the allowable percentage of the lateral acceleration that occurs in the vehicle as it negotiates the curve so that it decreases as the road surface friction coefficient increases. Hence, the curve approach control apparatus of second aspect of the present invention improves safety when the vehicle travels on a high $\mu$ road.

Further, the curve approach control apparatus of third aspect has the allowable lateral acceleration setting means in the curve approach control apparatus of the first aspect set to a constant percentage the allowable percentage of the lateral acceleration that occurs in the vehicle as it negotiates the curve when the road surface friction coefficient is equal to or less than a preset value. And, when the road surface friction coefficient is in excess of the preset value, set the allowable lateral acceleration to a predetermined constant value. Hence, the curve approach control apparatus of third aspect of the present invention keeps the allowable lateral acceleration at a safe value as the vehicle travels on a high $\mu$ road.

BRIEF DESCRIPTION OF THE DRAWINGS

FIG. 7 is a diagram showing the relation between a distance to the node of interest and an alarm speed.

DETAILED DESCRIPTION OF THE PREFERRED EMBODIMENT

Figure 1:
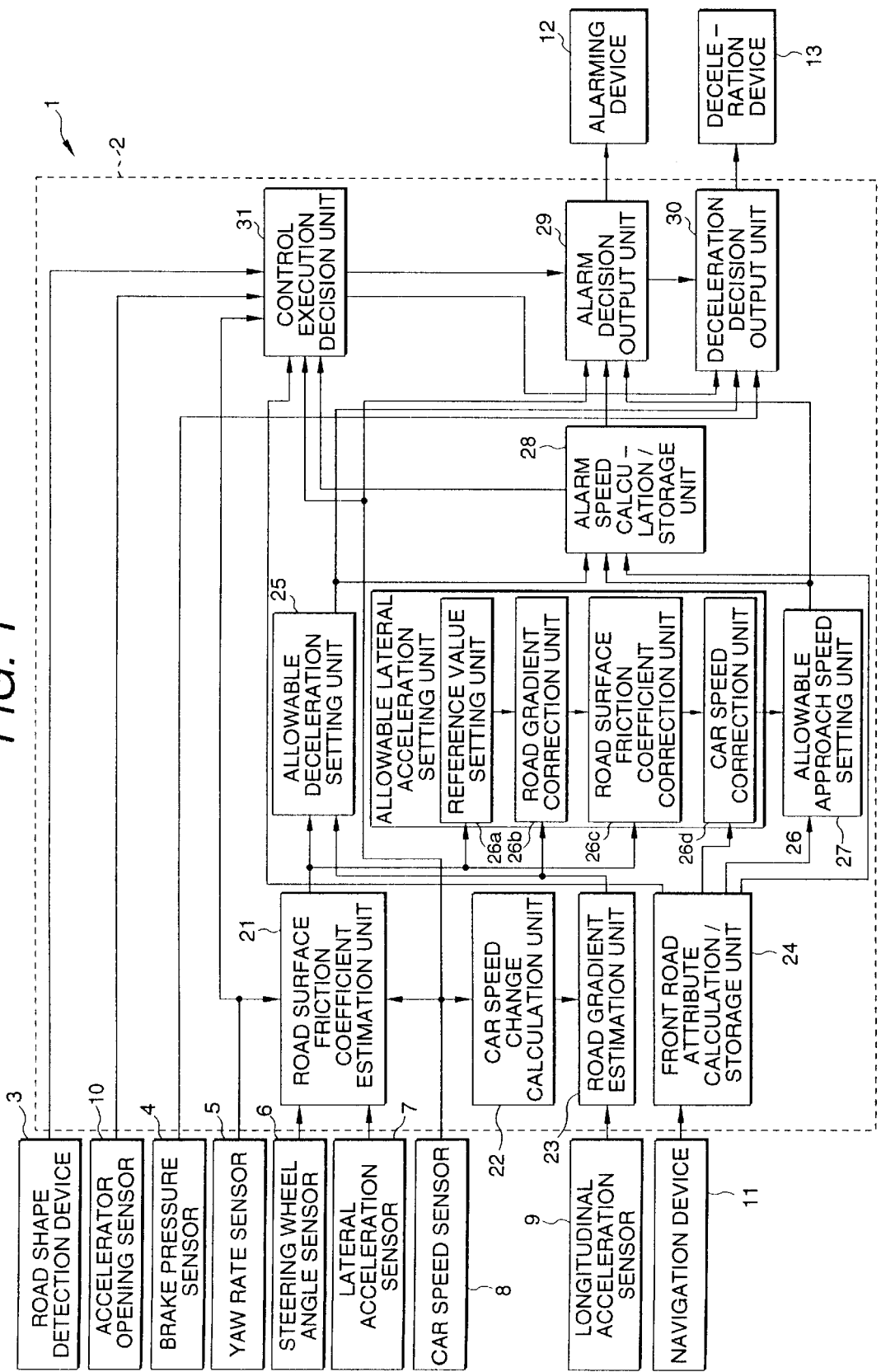
FIG. 1 is a functional block diagram showing a curve approach control apparatus.
Figure 2:
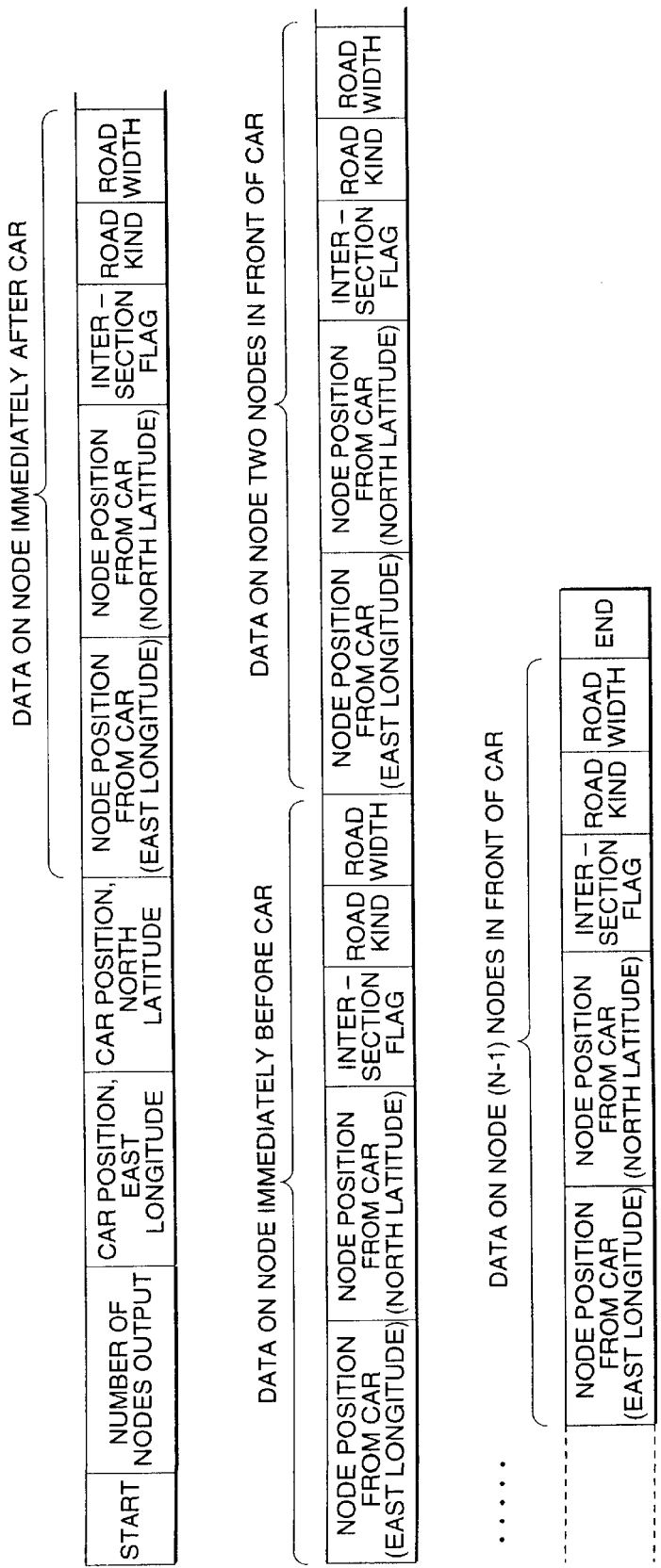
FIG. 2 is an explanatory diagram showing data supplied from a navigation device.
Figure 3:
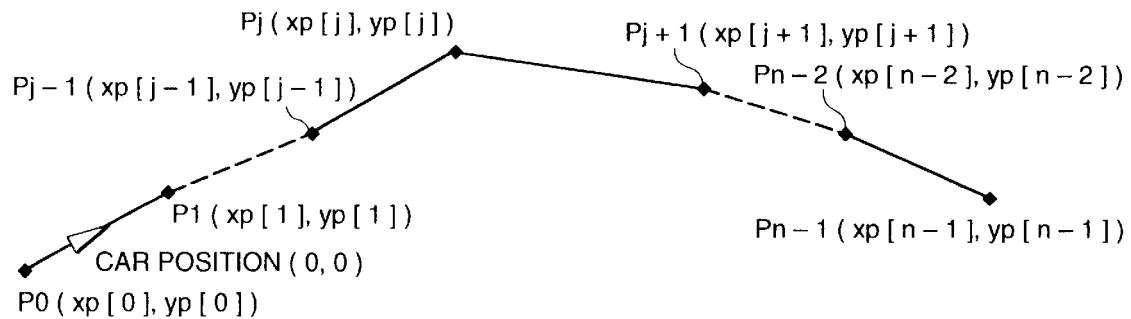
FIG. 3 is an explanatory diagram showing a vehicle position and nodes.
Figure 4:
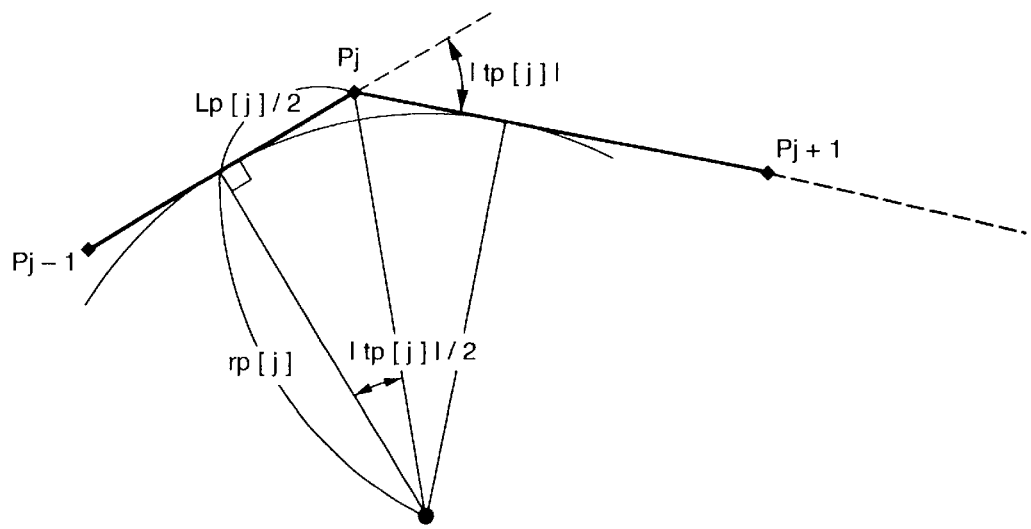
FIG. 4 is an explanatory diagram showing how a node angle and a curve's radius of curvature are calculated.

An embodiment of the present invention will be described by referring to the accompanying drawings. FIGS. 1 to 7 represent one embodiment of the invention. FIG. 1 is a functional block diagram showing a curve approach control apparatus; FIG. 2 is an explanatory diagram showing data supplied from a navigation device; FIG. 3 is an explanatory diagram showing a vehicle position and nodes; FIG. 4 is an explanatory diagram showing how a node angle and a curve's radius of curvature are calculated; FIG. 5 is an explanatory diagram showing how an allowable lateral acceleration is calculated; FIG. 6 is an explanatory diagram showing an example of a vehicle speed correction coefficient; and FIG. 7 is a diagram showing the relation between a distance to the node of interest and an alarm speed.

In FIG. 1, reference numeral 1 represents a curve approach control apparatus. A control unit 2 of the curve approach control apparatus 1 is connected with sensors, such as brake pressure sensor 4, yaw rate sensor 5, steering wheel angle sensor 6, lateral acceleration sensor 7, vehicle speed sensor 8, longitudinal acceleration sensor 9 and accelerator opening sensor 10, and receives signals detected by these sensors, such as brake pressure, yaw rate, steering wheel angle, lateral acceleration, vehicle speed, longitudinal acceleration and accelerator opening.

The control unit 2 is also connected with a road shape detection device 3 and receives image information on the shape of a road in front. The road shape detection device 3 has, for example, a pair of CCD cameras that photograph an image of the front road in stereo. The road shape detection device 3 processes the road image to recognize a white line, a guardrail, a road side boundary and others, detect a distance to a point where the road in front begins to curve and classify the curve according to its degree into, for example, a large right curve, a moderate right curve, an almost straight curve, a moderate left curve and a large left curve.

The control unit 2 is also connected with a navigation device 11, every 500 ms for example, the navigation device 11 outputs information including a node number n along a vehicle travel route, an east longitude and a north latitude of vehicle position, data on a node directly after the vehicle, and data on nodes within a set range of the vehicle travel route in front of the vehicle (data on a node directly before the vehicle, data on a second node in front of the vehicle, . . . , data on an (n−1)th node in front of the vehicle), as shown in FIG. 2. Data on each node includes, as shown, information such as an eastward distance from the vehicle position to the node, an northward distance from the vehicle position to the node, an intersection flag indicating whether there is an intersection at the node position, a road kind or category, and a road width.

When the driver or the like inputs a destination, the navigation device 11 sets an optimum guided path the vehicle should travel to reach the input destination. Then, the navigation device 11 outputs to the control unit 2 data on nodes on the set guided path up to, for example, 300 m ahead of the vehicle and data on a node immediately after the vehicle as node data of the vehicle travel route.

When on the other hand a destination is not entered by the driver or the like, the navigation device 11 estimates the order of priority of paths that the vehicle will travel, based on information such as road kind and road width and sets a path having the highest priority as an estimated path. Then, the navigation device 11 outputs to the control unit 2 the data on the nodes on the set estimated path up to, for example, 300 m ahead of the vehicle and the data on the node immediately after the vehicle as the node data of the vehicle travel route.

Based on inputs from the sensors 4, 5, 6, 7, 8, 9, 10, the road shape detection device 3 and the navigation device 11, the control unit 2 determines whether the vehicle can safely negotiate a curve of the road in front and, if necessary, issues an alarm to the driver through an alarming device 12 such as buzzer/voice alarm and alarm lamp. At the same time when a forced deceleration is required, the control unit 2 issues a deceleration command to the deceleration device 13 to execute a deceleration control by downshifting of a transmission, reducing an engine torque and applying a brake.

For that purpose, the control unit 2 comprises a road surface friction coefficient estimation unit 21, a vehicle speed change calculation unit 22, a road gradient estimation unit 23, a front road attribute calculation/storage unit 24, an allowable deceleration setting unit 25, an allowable lateral acceleration setting unit 26, an allowable approach speed setting unit 27, an alarm speed calculation/storage unit 28, an alarm decision output unit 29, a deceleration decision output unit 30, and a control execution decision unit 31.

The road surface friction coefficient estimation unit 21 constitutes a road surface friction coefficient estimation means that estimates the road surface friction coefficient $\mu$ (road surface $\mu$) while the vehicle is traveling, based on the yaw rate from the yaw rate sensor 5, the steering wheel angle from the steering wheel angle sensor 6, the lateral acceleration from the lateral acceleration sensor 7 and the vehicle speed from the vehicle speed sensor 8. The estimated road surface $\mu$ (estimated road surface $\mu$ value) is output to the allowable deceleration setting unit 25 and the allowable lateral acceleration setting unit 26. The estimation of the road surface $\mu$ by the road surface friction coefficient estimation unit 21 is performed using a calculation method (which estimates the road surface $\mu$ by an adaptive control) detailed in Japanese Patent Unexamined Publication No. Hei. 8-2274 (JP-A-8-2274) filed by the applicant of this invention.

Based on the vehicle speed from the vehicle speed sensor 8, the vehicle speed change calculation unit 22 calculates a rate of change of the vehicle speed every set duration of time and outputs the calculated result to the road gradient estimation unit 23.

The road gradient estimation unit 23, based on the longitudinal acceleration from the longitudinal acceleration sensor 9 and the rate of change of the vehicle speed from the vehicle speed change calculation unit 22, estimates the road gradient SL and outputs the calculated result to the allowable deceleration setting unit 25 and the allowable lateral acceleration setting unit 26. The road gradient SL is estimated by using a method detailed in Japanese Patent Unexamined Publication No. Hei. 11-83501(JP-A-11-83501) filed by the applicant of this invention.

The front road attribute calculation/storage unit 24, based on the position information for each node sent from the navigation device 11, calculates an interval to an immediately preceding node, a curve's radius of curvature and a node angle with respect to each node. These calculated values are stored as attribute information for each node along with information on intersection identification, road kind, road width and singular point identification described later.

In more concrete terms, the front road attribute calculation/storage unit 24 uses node coordinates (see FIG. 3) with the vehicle position as a reference which is supplied from the navigation device 11 to calculate the interval Lp[j] between the node Pj (xp[j], yp[j]) and an immediately preceding node Pj−1 (xp[j−1], yp[j−1]) for each node from the following formula:

$$Lp[j]=((xp[j]-xp[j-1])^2+(yp[j]-yp[j-1])^2)^{1/2}$$

(where 1<j<n−1)

The front road attribute calculation/storage unit 24 calculates the node angle tp[j] at each node Pj based on the node coordinates as shown in FIG. 4.

$$tp[j]=\sin^{-1}(((xp[j-1]-xp[j])\cdot(yp[j]-yp[j+1]) -(xp[j]-xp[j+1])\cdot(yp[j-1]-yp[j]))/(Lp[j]Lp[j+1]))$$

The node angle tp[j] obtained here is represented by a positive value for a right curve and by a negative value for a left curve.

Based on the calculated result, the front road attribute calculation/storage unit 24 calculates the curve's radius of curvature rp[j] at the node Pj from $$rp[j]=\min (Lp[j], Lp[j+1])/2/\tan(|tp[j]|/2)$$

where min (Lp[j], Lp[j+1]) means selecting Lp[j] or Lp[j+1], which ever is shorter. For example, in FIG. 4 Lp[j]<Lp[j+1], so min (Lp[j], Lp[j+1])=Lp[j].

The front road attribute calculation/storage unit 24 uses data supplied from the navigation device 11 as is (i.e., using data predefined by the navigation device 11) to set, for each node, an intersection identification (whether the node represents an intersection or whether it represents an intersection on the guided path), a kind of road (national expressway, city expressway, general national road, major local road, others) and road width.

Further, the front road attribute calculation/storage unit 24 judges each node supplied from the navigation device 11 for singularity and, when the node Pj is determined to be a singular point, recalculates the node angle tp[j+1] and the curve's radius of curvature rp[j+1] between the node Pj−1 and Pj+1 by excluding the node Pj which was determined to be a singular node.

That is, when the adjacent nodes are too close to each other, the calculated curve's radius of curvature may become excessively smaller than the actual road's radius of curvature. As a result, the alarm control and the deceleration control are activated too responsively in a moderate curve. To prevent this, the front road attribute calculation/storage unit 24 excludes such a node as a singularity point from the calculation of the node angle and the curve's radius of curvature according to the node interval Lp[j] and node angle tp[j] by considering the road kind attribute cp[j] and road width attribute wp[j].

Next, based on the estimated road surface $\mu$ value from the road surface friction coefficient estimation unit 21 and the road gradient SL from the road gradient estimation unit 23, the allowable deceleration setting unit 25 sets a deceleration XgLim that the vehicle can tolerate (allowable deceleration). Specifically, as detailed in JP-A-11-83501 filed by the applicant of this invention, a reference value XgLim0 is calculated based on the present estimated road surface $\mu$ value, and then corrected by using the road gradient SL to set an allowable deceleration XgLim.

Based on the estimated road surface $\mu$ value from the road surface friction coefficient estimation unit 21, the road gradient SL from the road gradient estimation unit 23 and the curve'radius of curvature rp[j] from the front road attribute calculation/storage unit 24, the allowable lateral acceleration setting unit 26 sets the lateral acceleration that the vehicle can tolerate for each node as the allowable lateral acceleration and outputs it to the allowable approach speed setting unit 27.

That is, the allowable lateral acceleration setting unit 26 is provided as an allowable lateral acceleration setting means and mainly comprises a reference value setting unit 26a, a road gradient correction unit 26b, a road surface friction coefficient correction unit 26c, and a vehicle speed correction unit 26d.

First, the reference value setting unit 26a is supplied the estimated road surface $\mu$ value from the road surface friction coefficient estimation unit 21 and calculates a reference value ayll of the allowable lateral acceleration from, for example, the following equation:

$$ayll=(\text{road surface } \mu \text{ of curve})\cdot(\text{safety factor } K\mu s)\cdot(\text{gravity acceleration g})$$

Here, it is assumed that the road surface $\mu$ of the curve remains constant at the present road surface $\mu$ and the value estimated by the road surface friction coefficient estimation unit 21 is used as is for calculation. The safety factor K$\mu$s is set at around 0.5–1.0 considering the estimation accuracy of the road surface $\mu$ and vehicle characteristics (for example, the lateral acceleration of 0.5 g cannot be generated even when the road surface $\mu$ is 0.5).

Next, the road gradient correction unit 26b corrects the reference value ayll of the allowable lateral acceleration with the road gradient SL from the road gradient estimation unit 23 to determine an allowable acceleration ay12 according to the following equation.

$$ay12=(ayll^2-(g\cdot\sin(SL/100))^2)^{1/2}\cong(ayll^2-(g\cdot SL/100)^2)^{1/2}$$

That is, the tire's lateral force becomes maximum when the tire's longitudinal force is zero. At this time, in an uphill a deceleration occurs increasing the safety margin whereas in a downhill an acceleration occurs increasing the level of danger. Hence, the road gradient correction unit 26b assumes that the combined force of the longitudinal force and the lateral force that can be produced in the tire is constant as a frictional circle, and corrects the allowable lateral acceleration during the downhill by subtracting from it a braking force required for the vehicle to travel at a constant speed.

The road surface friction coefficient correction unit 26c further corrects the allowable lateral acceleration ay12 thus obtained according to the road surface $\mu$ to determine an allowable lateral acceleration ay13. The allowable lateral acceleration ay13 can be calculated from the following equation using a coefficient K$\mu$ for the road surface $\mu$.

$$ay13=ay12\cdot K\mu$$

Figure 5A:
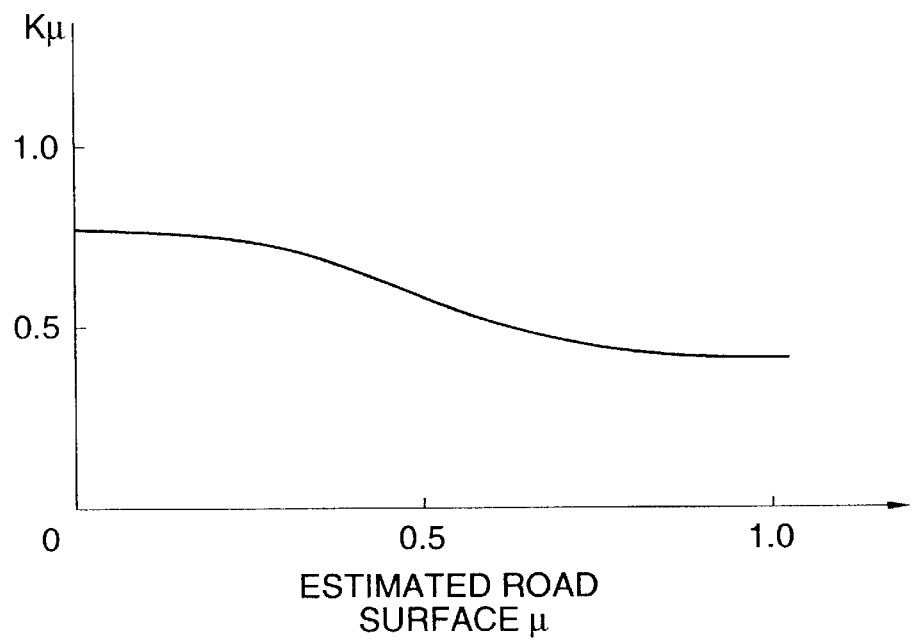
FIG. 5 is an explanatory diagram showing how an allowable lateral acceleration is calculated.
Figure 5B:
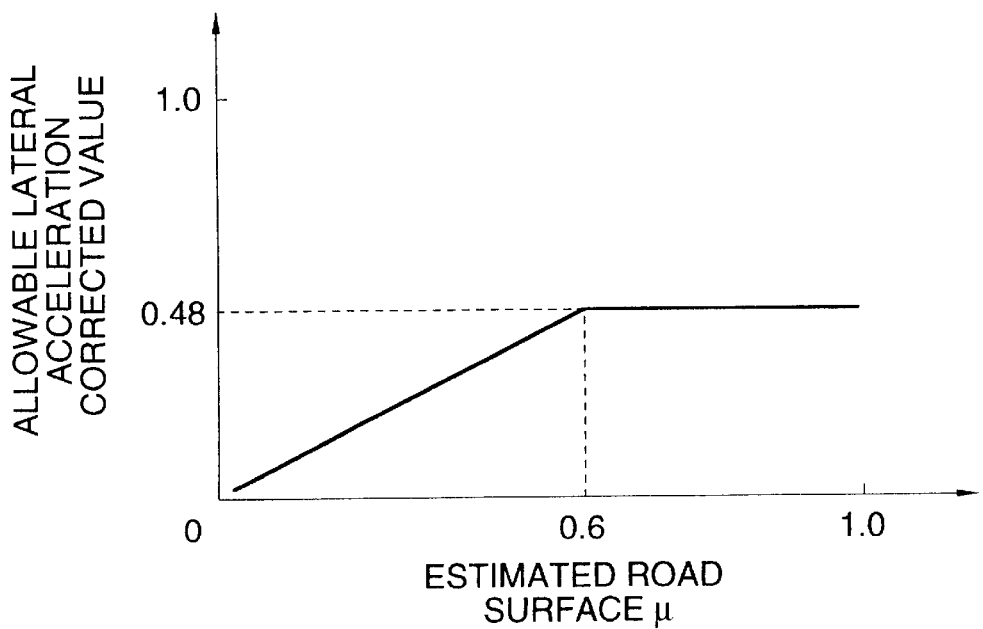
Figure 6:
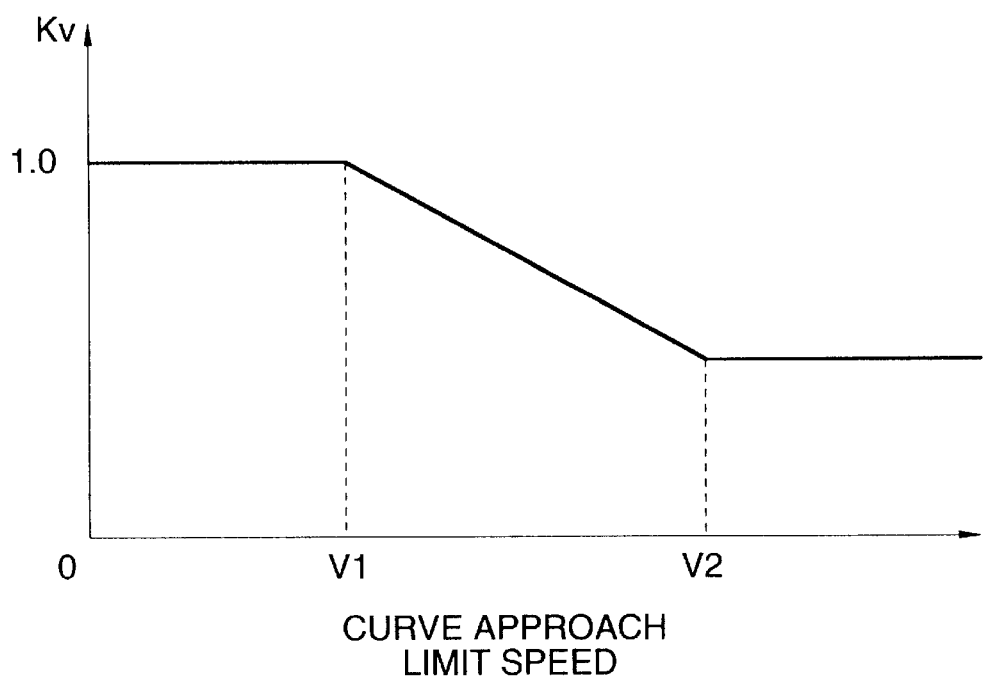
FIG. 6 is an explanatory diagram showing an example of a vehicle speed correction coefficient.

Here, the coefficient K$\mu$ is preset so that it decreases as the estimated road surface $\mu$ increases, as shown in FIG. 5A. That is, to improve the high-speed travel safety on a high $\mu$ road, a correction is made so that the allowable lateral acceleration at the curve decreases as the estimated road surface $\mu$ value increases. This correction increases the safety margin for the allowable lateral acceleration as the road surface $\mu$ increases, thereby ensuring higher safety when the vehicle is traveling at high speed.

In addition to the above, the allowable lateral acceleration ay13 may be determined as shown in FIG. 5 (B) When the estimated road surface $\mu$ value is higher than a predetermined value (e.g., 0.6), the allowable lateral acceleration ay13 is set to a predetermined fixed value (e.g., 0.48). When the estimated road surface $\mu$ value is smaller than the predetermined value, the allowable lateral acceleration ay13 is determined by using the coefficient Ku' for the road surface $\mu$ (inclination: 0.8 for example) as follows.

$$ay13=ay12 \cdot K\mu'$$

By setting the allowable lateral acceleration ay13 in this way, the value of the allowable lateral acceleration ay13 will not become large when the estimated road surface $\mu$ value is higher than the predetermined value (e.g., 0.6), thus improving the high-speed travel safety on a high $\mu$ road.

Then, the vehicle speed correction unit 26d corrects, with the vehicle speed, the allowable lateral acceleration ay13 calculated by the road surface friction coefficient correction unit 26c to obtain a final allowable lateral acceleration ayl. The final allowable lateral acceleration ayl is calculated by the following equation, for example.

$$ayl=ay13 \cdot (\text{vehicle speed correction coefficient Kv})$$

Here, the vehicle speed correction coefficient Kv is set so that it decreases as the curve approach limit speed calculated by, for example, $(ay11 \cdot rp[j])^{1/2}$ increases, as shown in FIG. 6. That is, to enhance the safety when the vehicle is cornering at high speed, the correction is made so that the allowable lateral acceleration at the curve decreases as the curve approach limit speed increases.

The allowable approach speed setting unit 27 is formed as a allowable approach speed setting means and calculates an allowable approach speed vap of the vehicle for each node based on the node attribute information stored in the front road attribute calculation/storage unit 24 and the allowable lateral acceleration ayl set by the allowable lateral acceleration setting unit 26.

That is, the allowable approach speed setting unit 27 uses the allowable lateral acceleration ayl and the curve's radius of curvature rp[j] to determine the allowable approach speed reference value vap0[j] for each node Pj from the following equation.

$$vap0[j]=(ayl \cdot rp[j])^{1/2}$$

Further, the allowable approach speed setting unit 27 judges the node interval Lp[j] and the sign of the node angles tp[j−1], tp[j] to see if the adjacent nodes make up the same curve.

Then, the allowable approach speed setting unit 27 determines a curve depth tpa for each node (i.e., a value indicating at which degree from the start of the curve the node is situated particularly when the curve is made up of a plurality of nodes). By using this curve depth tpa, the allowable approach speed setting unit 27 corrects the reference value vap0 of the allowable approach speed for each node to determine an allowable approach speed vap1. When an independent curve exists for each node and this node is taken as Pj, the curve depth tpa[j] is tpa[j]=tp[j].

The allowable approach speed vap1 can be determined from, for example, $$vap1=vap0 \cdot (\text{curve depth correction coefficient Kt})$$

The curve depth correction coefficient Kt is so set that it decreases as the curve depth tpa increases. This is intended to make a correction such that the allowable approach speed at the curve decreases as the curve depth tpa increases because the cornering becomes difficult when the curve depth tpa is large.

When the curve is tight with the curve's radius of curvature rp[j] for each node less than a predetermined percentage rwk of the road width wp[j], the allowable approach speed setting unit 27 further corrects the allowable approach speed vap1 to determine an allowable approach speed vap2 in order to prevent the allowable approach speed from becoming extremely small. The allowable approach speed vap2 is set by comparing a predetermined value $(ayl \cdot wk \cdot rwk)^{1/2}$ corresponding to the road width with the allowable approach speed vap1 and selecting whichever is larger. That is, the allowable approach speed vap2 is determined from $$vap2=\max (vap1, (ayl \cdot wk \cdot rwk)^{1/2})$$

Further, the allowable approach speed setting unit 27 smoothes out the allowable approach speeds vap2 of the nodes making up the same curve to adjust variations of the allowable approach speed vap2 and determine a final allowable approach speed vap for each node.

In more concrete terms, the smoothing of the allowable approach speeds by the allowable approach speed setting unit 27 consists in: comparing three values, which are an allowable approach speed vap2[j] for the node Pj of interest among the nodes making up the same curve, an average of the allowable approach speed vap2[j] and an allowable approach speed vap2[j+1] for the next node Pj+1, and an average of the allowable approach speed vap2[j] and an allowable approach speed vap2[j−1] for the preceding node Pj−1; and setting a median value of the three values as a final allowable approach speed vap for the node Pj.

For all of the n nodes sent from the navigation device 11, excluding the node P0 immediately after the vehicle, the farthest node Pn−1 and the singular node, the alarm speed calculation/storage unit 28 uses the node interval Lp[j], allowable deceleration XgLim and allowable approach speed vap[j] to calculate an alarm speed vw[j] that constitutes a reference for the alarm control.

The alarm speed vw[j] is set such that when the vehicle is decelerated by, for example, 50% of the allowable deceleration XgLim while the vehicle travels from the present vehicle position to the node Pj of interest, the vehicle speed will become the allowable approach speed vap[j]. The alarm speed wp[j] can be determined from $$vw[j]=(vap[j]^2+2 \cdot (0.5 \cdot XgLim)LL[j])^{1/2}$$

Here, LL[j] is a distance from the vehicle position to the node Pj and can be determined as follows.

When j=1, $$LL[1]=(xp[1]^2+yp[1]^2)^{1/2}; \text{ and}$$

When $2 \leq j \leq n-1$, $$LL[j]=LL[1]+Lp[2]+Lp[3]+\ldots+Lp[j]$$

Further, the alarm decision output unit 29 decides whether it is necessary to output an alarm, based on the vehicle speed v detected by the vehicle speed sensor 8, the allowable approach speed vap[j] set for each node by the allowable approach speed setting unit 27 and the alarm speed vw[j] calculated for each node by the alarm speed calculation/storage unit 28. Then, when the alarm decision output unit 29 decides that it is necessary to output an alarm and receives a command signal for executing the alarm control from the control execution decision unit 31, the alarm decision output unit 29 outputs a control signal to the alarming device 12 to execute the alarm control.

In more concrete terms, the alarm decision output unit 29 sets as a node of interest for executing the alarm control the node which has a minimum alarm speed vw[j] calculated by the alarm speed calculation/storage unit 28 and, as shown in FIG. 7, compares the alarm speed vw at the node of interest with the vehicle speed v entered from the vehicle speed sensor 8. When the vehicle speed v is larger than the alarm speed vw and a difference between the allowable approach speed vap at the node of interest and the vehicle speed v is equal to or more than a predetermined value vk1 (for example, 5 km/h), the alarm decision output unit 29 decides that the vehicle is running in an overspeed state and that it is necessary to issue an alarm (for example, an alarm position at time of large overspeed in the figure). When the difference between the vehicle speed v and the allowable approach speed vap at the node of interest is equal to or more than the predetermined value vk1 but when the vehicle speed v is still not in excess of the alarm speed vw and the distance LL to the node of interest is equal to or less than a predetermined value vrdxell, the alarm decision output unit 29 decides that the vehicle is running in an overspeed state and that it is necessary to output an alarm (for example, an alarm position at time of moderate overspeed in the figure). Here, the predetermined value vrdxell is a function of vehicle speed and takes a greater value as the vehicle speed increases. For example, it is set to vrdxell=2·v (=distance traveled for two seconds).

The deceleration decision output unit 30 judges whether a forced deceleration is required for the node of interest for which the alarm decision output unit 29 has decided that an alarm output is necessary. That is, when the driver has not performed an appropriate deceleration operation for a predetermined period (for example, two seconds) after the alarm decision output unit 29 has decided that it is necessary to output an alarm to the node of interest, the deceleration decision output unit 30 decides that it is necessary to perform the deceleration operation on this node. When the deceleration decision output unit 30 decides that the deceleration is required and receives a deceleration control execution command signal from the control execution decision unit 31, the deceleration decision output unit 30 outputs a control signal to the deceleration device 13 to execute the deceleration control.

For the node of interest which was judged by the alarm decision output unit 29 as a node subject to the alarm control or which was judged by the deceleration decision output unit 30 as a node subject to the deceleration control, the control execution decision unit 31 judges whether or not the control shall be actually executed.

That is, first, for the node that has been judged as an object for the alarm control, the control execution decision unit 31 judges whether the node of interest actually exists on the road, for example, as by reading the curve's radius of curvature rp at the node from the road attribute stored in the front road attribute calculation/storage unit 24, reading the distance LL to the node stored in the alarm speed calculation/storage unit 28, and judging the curve's radius of curvature rp and the distance LL against the degree of curvature of the road in front and the curve start point, both recognized by the road shape detection device 3. When they coincide, the control execution decision unit 31 decides that the node of interest actually exists on the road and gives a control execution permission to the node that was judged as being subject to the alarm or deceleration control. When they do not coincide, the road information in the map stored in the storage means such as CD-ROM of the navigation device 11 is considered to differ from the actual road state due to road extension or modification constructions. Thus, the control execution decision unit 31 cancels the execution of the alarm and deceleration control for that node.

Further, if, when passing through an intersection, the vehicle moves in a straight line as opposed to a curved line expected by the navigation device 11, the control execution decision unit 31 also cancels the alarm control or deceleration control for the node of interest. This decision is made by recognizing the yaw rate detected by the yaw rate sensor 5 immediately before the vehicle passes the node of interest against the estimated yaw rate (v/rp) based on the curve's radius of curvature rp and the vehicle speed v. If the detected yaw rate is less than a predetermined percentage of the estimated yaw rate (v/rp), the control execution decision unit 31 decides that the vehicle is moving straight on, canceling the execution of the alarm and deceleration controls on the node of interest.

When the control execution decision unit 31 permits the execution of the alarm control or deceleration control for the node of interest, the alarm decision output unit 29 issues an alarm command signal to the alarming device 12 to alert the driver that the vehicle is on the verge of entering the curve.

When necessary, the deceleration decision output unit 30 issues a deceleration command signal to the deceleration device 13. According to the deceleration command from the deceleration decision output unit 30, the deceleration device 13 performs a forced deceleration operation as by downshifting the transmission, reducing the engine torque and activating the brake.

As described above, in this embodiment a decision control means to predict and judge the approach to a curve and execute a predetermined control is comprised mainly of the allowable deceleration setting unit 25, the alarm speed calculation/storage unit 28, the alarm decision output unit 29, the deceleration decision output unit 30 and the control execution decision unit 31.

Although this embodiment determines curve information based on the information from the navigation device 11, the curve information may be obtained in other methods. For example, the curve information obtained from radar and camera may be used. Further, the curve information may be determined from information supplied from ITS (intelligent transportation system).

As described above, according to a curve approach control apparatus as shown in a first aspect of the present invention, because the allowable percentage of the lateral acceleration that occurs in the vehicle as it negotiates the curve is corrected according to the road surface friction coefficient to set the lateral acceleration that the vehicle can tolerate as an allowable acceleration, because the approach speed at which the vehicle can negotiate the curve is set as an allowable approach speed on the basis of at least the allowable lateral acceleration, and because the approach of the vehicle to the curve is estimated and judged based on at least the allowable approach speed to execute a predetermined control, it is possible to consider the condition of a low $\mu$ road or high $\mu$ road, optimumly set the allowable lateral acceleration, and further improve the safety of the vehicle.

In this case, if the allowable percentage of the lateral acceleration that occurs in the vehicle as it negotiate the curve is corrected so that it decreases as the road surface friction coefficient increases, in a curve approach control apparatus as shown in a second aspect of the invention, the safety margin for the allowable lateral acceleration increases as the road surface friction coefficient increases, making it possible to secure a higher safety when the vehicle is traveling at high speed.

Alternatively, if the allowable percentage of the lateral acceleration that occurs as the vehicle negotiates the curve is set to a constant percentage when the road surface friction coefficient is equal to or less than a preset value and, when it exceeds the preset value, the allowable lateral acceleration is set to a predetermined constant value, in a curve approach control apparatus as shown in a third aspect of the invention, the value of the allowable lateral acceleration based on the road surface friction coefficient can be prevented from becoming large when the road surface friction coefficient exceeds the preset value, thus improving the high-speed travel safety on a high $\mu$ road.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A curve approach control apparatus comprising:
    an allowable lateral acceleration setting means for setting as an allowable lateral acceleration a lateral acceleration that a vehicle can tolerate when it negotiates a curve in front;
    an allowable approach speed setting means for setting as an allowable approach speed an approach speed at which the vehicle can negotiate the curve, based on at least the allowable lateral acceleration;
    a decision control means for estimating and judging an approach of the vehicle to the curve based on at least the allowable approach speed and execute a predetermined control; and
    a road surface friction coefficient estimation means for estimating a road surface friction coefficient;
    wherein said allowable lateral acceleration setting means corrects, according to the road surface friction coefficient, an allowable percentage of the lateral acceleration that occurs in the vehicle as it negotiates the curve and sets the allowable lateral acceleration.

2. The curve approach control apparatus according to claim 1, wherein said allowable lateral acceleration setting means corrects the allowable percentage of the lateral acceleration that occurs in the vehicle as it negotiates the curve so that it decreases as the road surface friction coefficient increases.

3. The curve approach control apparatus according to claim 1, wherein said allowable lateral acceleration setting means sets to a constant percentage the allowable percentage of the lateral acceleration that occurs in the vehicle as it negotiates the curve when the road surface friction coefficient is equal to or less than a preset value and, when the road surface friction coefficient is in excess of the preset value, sets the allowable lateral acceleration to a predetermined constant value.

4. A method for curve approach control of a vehicle comprising:
    setting as an allowable lateral acceleration a lateral acceleration that a vehicle can tolerate when it negotiates a curve in front;
    setting as an allowable approach speed an approach speed at which the vehicle can negotiate the curve, based on at least the allowable lateral acceleration;
    estimating and judging an approach of the vehicle to the curve based on at least the allowable approach speed and execute a predetermined control; and
    estimating a road surface friction coefficient,
        wherein said setting step for setting allowable lateral acceleration further comprising:
        correcting, according to the road surface friction coefficient, an allowable percentage of the lateral acceleration that occurs in the vehicle as it negotiates the curve; and
        setting the allowable lateral acceleration.

5. The method for curve approach control of a vehicle according to claim 4, wherein said setting step for setting allowable lateral acceleration comprises:
    correcting the allowable percentage of the lateral acceleration that occurs in the vehicle as it negotiates the curve so that it decreases as the road surface friction coefficient increases.

6. The method for curve approach control of a vehicle according to claim 4, wherein said setting step for setting allowable lateral acceleration comprises:
    setting to a constant percentage the allowable percentage of the lateral acceleration that occurs in the vehicle as it negotiates the curve when the road surface friction coefficient is equal to or less than a preset value; and
    setting the allowable lateral acceleration to a predetermined constant value when the road surface friction coefficient is in excess of the preset value.

7. A system for curve approach control of a vehicle comprising:
    an allowable lateral acceleration setting unit for setting as an allowable lateral acceleration a lateral acceleration that a vehicle can tolerate when it negotiates a curve in front;
    an allowable approach speed setting unit for setting as an allowable approach speed an approach speed at which the vehicle can negotiate the curve, based on at least the allowable lateral acceleration;
    a decision control unit for estimating and judging an approach of the vehicle to the curve based on at least the allowable approach speed and execute a predetermined control; and
    a road surface friction coefficient estimation unit for estimating a road surface friction coefficient;
    wherein said allowable lateral acceleration setting unit corrects, according to the road surface friction coefficient, an allowable percentage of the lateral acceleration that occurs in the vehicle as it negotiates the curve and sets the allowable lateral acceleration.

8. The system for curve approach control of a vehicle according to claim 7, wherein said allowable lateral acceleration setting unit corrects the allowable percentage of the lateral acceleration that occurs in the vehicle as it negotiates the curve so that it decreases as the road surface friction coefficient increases.

9. The system for curve approach control of a vehicle according to claim 7, wherein said allowable lateral acceleration setting unit sets to a constant percentage the allowable percentage of the lateral acceleration that occurs in the vehicle as it negotiates the curve when the road surface friction coefficient is equal to or less than a preset value and, when the road surface friction coefficient is in excess of the preset value, sets the allowable lateral acceleration to a predetermined constant value.

* * * * *